United States Patent [19]

Falterman et al.

[11] 4,042,430

[45] Aug. 16, 1977

[54] TEMPERATURE RESISTANT EXPLOSIVE CONTAINING DIAMINOTRINITROBENZENE

[75] Inventors: Charles W. Falterman, China Lake, Calif.; William J. Griffith, Chemult, Oreg.; Harold J. Gryting, Ridgecrest, Calif.

[73] Assignee: The United States of America as represented by the Secretary of the Navy, Washington, D.C.

[21] Appl. No.: 242,795

[22] Filed: Apr. 10, 1972

[51] Int. Cl.$^2$ .............................................. C06B 45/10
[52] U.S. Cl. ...................................... 149/19.3; 149/20; 149/39; 149/78; 149/92
[58] Field of Search ..................... 149/19, 38, 39, 44, 149/83, 92, 78, 3, 20

[56] References Cited

U.S. PATENT DOCUMENTS

| 3,068,129 | 12/1962 | Schaffel | 149/19 |
|---|---|---|---|
| 3,296,041 | 1/1967 | Wright | 149/19 X |
| 3,617,403 | 11/1971 | Johnson | 149/19 |
| 3,617,405 | 11/1971 | Stevenson | 149/38 X |
| 3,652,350 | 3/1972 | Timmermans | 149/19 X |
| 3,671,341 | 6/1972 | Dierolf | 149/19 |
| 3,756,874 | 9/1973 | Chang et al. | 149/92 X |

*Primary Examiner*—Edward A. Miller
*Attorney, Agent, or Firm*—R. S. Sciascia; Roy Miller; Lloyd E. K. Pohl

[57] ABSTRACT

A temperature stable explosive formulation which is comparatively inexpensive, moderately energetic and easy to initiate to detonation, which comprises aluminum, potassium perchlorate, diaminotrinitrobenzene, and vinylidene fluoride - perfluoropropene copolymer.

1 Claim, No Drawings

TEMPERATURE RESISTANT EXPLOSIVE CONTAINING DIAMINOTRINITROBENZENE

BACKGROUND OF THE INVENTION

The present invention relates to a temperature stable explosive formulation.

There are several known explosives which are thermally stable, but do not have sufficient energy and fail if the billet diameter is too small. The high temperature explosive systems based on 1,3,5-triamino-2,4,6-trinitrobenzene (TATB) and hexanitrostilbene (HNS) have a higher energy release rate and more energetic fragment acceleration than the fuel oxidizer comprising aluminum and potassium perchlorate. However, TATB and HNS are not readily available for production and cost from $200.00 – $300.00 per pound. The present composition is thermally stable and based on the raw materials used can be made for $3.00 or less per pound. This composition has a higher detonation velocity and is easier to initiate to detonation than similar explosive compositions.

BRIEF DESCRIPTION OF THE INVENTION

In accordance with the present invention a temperature resistant explosive consisting of aluminum, potassium perchlorate, diaminotrinitrobenzene (DATB) and the copolymer of vinylidene fluoride and perfluoropropene (Viton) (24/46/25/5) was prepared. The process consists of dissolving Viton in acetone, mixing in the aluminum, potassium perchlorate and DATB powders to form a slurry, then quenching with hexane. The resulting mixture is dried at ambient temperature and is ready to be pressed into billets of the desired size. Pressing usually takes place at 120° C. and at 20,000 to 30,000 psi. The pressed billets can be initiated to detonation in 1-inch or greater diameter by -inch diameter by -inch high tetryl pellets. At 97% of maximum density (2.2 g/cc) 4-inch diameter billets had a detonation velocity of 5750 meters/second. Thermal studies of a 4-inch diameter billet showed that its critical temperature was 254° C.

The following example will better illustrate the invention and the parts and percentages are by weight unless specifically expressed to the contrary.

A 25-pound batch of the explosive was prepared as follows: 1.25 pounds of Viton cut into small chunks were dissolved in 1.25 gallons of acetone in a closed 30-gallon slurry kettle. It may take overnight stirring at 50 rpm under ambient conditions to dissolve all the Viton. To this solution 6 pounds of aluminum and 11.5 pounds of potassium perchlorate were added while stirring to form a slurry to which 6.25 pounds of DATB were added while stirring to form a homogenous mixture. Ten gallons of hexane were rapidly added to the mixture which was stirred for about 5 minutes. The mixer was stopped and liquid was decanted. The hexane treatment was repeated two more times and the liquid was decanted. After the final decanting the material was dried in an air circulating oven at 70°–80° C for about 24 hours. The dried molding powder is now ready to be pressed at 120° C and 20,000-30,000 psi into billets of the desired size. As herein stated thermal studies indicate a critical temperature for 4-inch diameter charges of this material was 254° C. Using this figure it was calculated that at this diameter the billet could withstand a surface temperature of 316° C (600° F) for 35 minutes before cooking off.

The cost of this explosive based on raw materials alone is much less expensive than the organic high temperature explosive formulations based on TATB, HNS or DATB. An explosive based entirely upon DATB costs from $7–$50 per pound depending upon the quantity, is difficult to process and is less thermally stable than the instant formulation. The inventors found that by using the temperature resistant organic explosive, DATB, to sensitize a more temperature stable but less energetic inorganic explosive mixture they had an explosive formulation which to date is the most temperature stable of those in presently used systems.

The fuel-oxidizer part of the system (Al/KClO$_4$) can be replaced with any number of combinations such as titanium for the aluminum or sodium perchlorate for the potassium perchlorate.

What is claimed is:

1. An explosive composition comprising the following

| Ingredients | Percent by Weight |
| --- | --- |
| Aluminum | 24 |
| Potassium perchlorate | 46 |
| Diaminotrinitrobenzene | 25 |
| Copolymer of vinylidene flouride and perflouropropene | 5 |

* * * * *